United States Patent
Chung et al.

(10) Patent No.: US 10,641,112 B2
(45) Date of Patent: May 5, 2020

(54) BLADED DISK

(71) Applicant: ROLLS-ROYCE plc, London (GB)

(72) Inventors: Jae-Hoon Chung, Derby (GB); Malcolm L. Hillel, Derby (GB)

(73) Assignee: Rolls-Royce plc (GB)

( * ) Notice: Subject to any disclaimer, the term of this patent is extended or adjusted under 35 U.S.C. 154(b) by 325 days.

(21) Appl. No.: 16/112,940

(22) Filed: Aug. 27, 2018

(65) Prior Publication Data

US 2019/0106997 A1    Apr. 11, 2019

(30) Foreign Application Priority Data

Oct. 6, 2017 (GB) .................................. 1716371.8

(51) Int. Cl.
*F01D 5/02* (2006.01)
*F04D 29/32* (2006.01)
(Continued)

(52) U.S. Cl.
CPC ................ *F01D 5/34* (2013.01); *B23P 15/02* (2013.01); *F01D 5/282* (2013.01); *F01D 5/284* (2013.01); *F04D 29/321* (2013.01); *F04D 29/666* (2013.01); *F05D 2240/30* (2013.01); *F05D 2260/941* (2013.01); *F05D 2260/961* (2013.01);
(Continued)

(58) Field of Classification Search
CPC ... F01D 5/10; F01D 5/30; F01D 25/04; F05D 2260/96; F04D 29/666; F04D 29/321; B23P 15/02
See application file for complete search history.

(56) References Cited

U.S. PATENT DOCUMENTS

| | | | |
|---|---|---|---|
| 3,897,171 A | 7/1975 | Stahl | |
| 8,157,514 B2 * | 4/2012 | Reyes | ........................ F01D 5/26 415/199.4 |

(Continued)

FOREIGN PATENT DOCUMENTS

| | | |
|---|---|---|
| CN | 104314619 A | 1/2015 |
| EP | 1211383 A2 | 6/2002 |

(Continued)

OTHER PUBLICATIONS

Great Britain Search Report dated Mar. 6, 2018, issued in Great Britain Patent Application No. 1716371.8.
(Continued)

*Primary Examiner* — Ninh H. Nguyen
(74) *Attorney, Agent, or Firm* — Barnes & Thornburg LLP

(57) ABSTRACT

A bladed disk may be arranged to rotate about an axis of rotation and including a rotor disk having an axial length extending from a first end to a second end, along the axis of rotation and a radial thickness extending between a first radius from the axis of rotation and a second radius from the axis of rotation, less than the first radius. The bladed disk may include a plurality of blades formed integrally with the rotor disk and arranged circumferentially around the rotor disk, and a first set of divides and a second set of divides, each divide comprising a partial break in the rotor disk extending axially from the first end of the rotor disk to the second end of the rotor disk and radially from the first radius to a third radius, less than the first radius and greater than the second radius.

20 Claims, 4 Drawing Sheets

(51) Int. Cl.
*F01D 5/34* (2006.01)
*F04D 29/66* (2006.01)
*B23P 15/02* (2006.01)
*F01D 5/28* (2006.01)

(52) U.S. Cl.
CPC ............... *F05D 2300/6032* (2013.01); *F05D 2300/6033* (2013.01)

(56) References Cited

U.S. PATENT DOCUMENTS

| | | | |
|---|---|---|---|
| 8,262,817 B2 * | 9/2012 | Marshall | F01D 5/02 148/527 |
| 8,408,446 B1 * | 4/2013 | Smoke | B23P 15/006 228/193 |
| 10,161,251 B2 * | 12/2018 | Bintz | F01D 5/081 |
| 2011/0064580 A1 | 3/2011 | Barnes et al. | |
| 2012/0308381 A1 | 12/2012 | Suciu et al. | |
| 2016/0031935 A1 | 11/2016 | Potter et al. | |

FOREIGN PATENT DOCUMENTS

| | | |
|---|---|---|
| EP | 2000631 A2 | 12/2008 |
| EP | 2998049 | 3/2016 |
| FR | 3027340 | 4/2016 |

OTHER PUBLICATIONS

Extended European Search Report completed on Feb. 25, 2019 and issued in connection with EP Appln. No. 18192911.8, 9 pages.
Search Report for GB Application No. 1716371.8, dated Mar. 6, 2018, 1 page.
European Office Action, dated Feb. 21, 2020 in connection with European Application No. 18192911.8, 5 pages.

* cited by examiner

BLADED DISK

CROSS-REFERENCE TO RELATED APPLICATIONS

This application is based upon and claims the benefit of priority from British Patent Application No. GB 1716371.8, filed on 6 Oct. 2017, the entire contents of which are incorporated by reference.

BACKGROUND

Technical Field

The present disclosure concerns a bladed disk. In particular, but not exclusively, the present disclosure concerns a bladed disk for a gas turbine engine or boundary layer ingestion propulsion system.

Description of the Related Art

Gas turbine engines and boundary layer ingestion propulsion systems include a number of rotary fan components. These may form, for example, a propulsive fan, a boundary layer ingestion fan, compressors or turbines. A fan includes a central rotor disk having fan blades extending outwards therefrom. In a typical fan, each blade is formed separately, and is attached to the central disk by fixing a root of the blade into a respective slot in the disk. In a bladed disk (also known as an integrally bladed rotor), the blades are formed integrally with the disk, such that the fan component is formed of a single part.

Rotary fan components, including bladed disks, can be susceptible to flutter and forced response, which can cause damage to the blade, fan component and engine. Typically, bladed disks are arranged to avoid flutter by specific manufacture of the blades of the fan component.

SUMMARY

According to a first aspect there is provided a bladed disk arranged to rotate about an axis of rotation and including: a rotor disk having an axial length extending from a first end to a second end, along the axis of rotation and a radial thickness extending between a first radius from the axis of rotation and a second radius from the axis of rotation, less than the first radius; a plurality of blades formed integrally with the rotor disk and arranged circumferentially around the rotor disk; and a first set of divides and a second set of divides, each divide comprising a partial break in the rotor disk extending axially from the first end of the rotor disk to the second end of the rotor disk and radially from the first radius to a third radius, less than the first radius and greater than the second radius, the divides arranged such that a partial break is provided in the rotor disk between each of the blades, wherein the divides of the first set are different to the divides of the second set, and wherein the first set of divides and second set of divides are arranged in sequence circumferentially around the axis of rotation, such that the divides on either side of each blade are different.

The variation between the divides introduces asymmetric stiffness into the material supporting the blades and hence detunes the blades. Furthermore, the divides isolate material supporting each blade, so vibration cannot be passed around the circumference of the central rotor disk. Therefore, flutter is reduced. However, because the divide only extends part way through the thickness of the rotor disk, the bladed disk remains a single unitary piece.

Also, because the modification to reduce flutter is formed in the central rotor disk, rather than the blades, the blades can be of identical design, and no work is required on the air flow going into the bladed disk, and so fan performance can be optimised.

The bladed disk may comprise one or more further set of divides, each divide comprising a partial break in the rotor disk extending axially from the first end of the rotor disk to the second end of the rotor disk and radially from the first radius to a third radius, less than the first radius and greater than the second radius. The divides may be arranged such that a partial break is provided in the rotor disk between each of the blades, wherein the divides of each set of divides are different, and wherein the sets of divides are arranged in sequence circumferentially around the axis of rotation, such that the divides on either side of each blade are different.

Provision of three or more sets of divides further increases the asymmetry around the central rotor disk, providing greater control over how the flutter is reduced.

The rotor disk may comprise a foundation portion at the first radius that supports the plurality of blades; wherein each divide comprises a first radial portion and a second radial portion; wherein the first radial portion determines the stiffness of the adjacent foundation portions, and wherein the second radial portion isolates the foundation portion associated with circumferentially adjacent blades.

The first radial portion of each of the first set of divides may have different size and/or shape to the first radial portion of each of the second set of divides, such that stiffness of the foundation portion varies circumferentially around the rotor disk.

The first radial portion of each divide may be provided at the third radius, and the second radial portion of each divide may extend from the first radius to the first radial portion.

The first radial portion of each divide may comprise a through-hole extending from the first end of the rotor disk to the second end of the rotor disk, and the second radial portion of each divide may comprise a slot extending from the first radius to the through-hole.

In a cross section perpendicular to the axis of rotation, each through-hole may have a shape and size, wherein the through-holes in the same set may have the same shape and/or size, and wherein through-holes of different sets may have different shape and/or size.

The arrangement of a through-hole of variable shape and/or size and a slot provides a bladed disk that is simple to form, whilst also making it easy to tune the stiffness characteristics of the blade support material.

The bladed disk may include filler material provided in at least part of each divide. The filler material may be provided in a region extending from the first radius. The filler material provides continuity in the structure of the disk whilst maintaining the partial division of the disk to prevent vibrations extending around the disk. The continuity of structure provides improved strength in the disk.

The filler material may comprise a resiliently deformable material. This provides a secondary damping mechanism, for reducing vibrations and flutter. The resiliently deformable material may be a visco-elastic material.

The first radius may define an outer surface of the rotor disk, wherein each blade may comprise a hub where the blade joins the rotor disk, wherein the hub of each blade follows a curved path along the outer surface of the rotor disk, and wherein each divide extends parallel to the blade hubs. The divides following the path of the blade hubs provides isolation along the length of the blade hub.

The bladed disk may be formed of a meta matrix composite material. The meta matric composite may provide improved strength.

According to a second aspect, there is provided a turbine engine comprising one or more bladed disk according to the first aspect.

The bladed disk may form the propulsion fan and/or may be provided in a compressor stage and/or a turbine stage.

According to a third aspect, there is provided a layer ingestion propulsion system comprising one or more bladed disk according to the first aspect.

The bladed disk may form the ingestion fan, and/or may be provided in a compressor stage and/or a turbine stage.

According to a fourth aspect, there is provided a method of manufacturing a bladed disk, the method including: constructing, as a single integral component, a rotor disk and a plurality of blades arranged circumferentially around the rotor disk, the rotor disk having an axial length extending from a first end to a second end, along an axis of rotation of the bladed disk and a radial thickness extending between a first radius from the axis of rotation and a second radius from the axis of rotation, less than the first radius; forming a first set of divides and a second set of divides, each divide comprising a partial break in the rotor disk extending axially from the first end of the rotor disk to the second end of the rotor disk and radially from the first radius to a third radius, less than the first radius and greater than the second radius, the divides arranged such that a partial break is provided in the rotor disk between each of the blades, wherein the divides of the first set are different to the divides of the second set, and wherein the first set of divides and second set of divides are arranged in sequence circumferentially around the axis of rotation, such that the divides on either side of each blade are different.

The variation between the divides introduces asymmetric stiffness into the material supporting the blades and hence detunes the blades. Furthermore, the divides isolate material supporting each blade, so vibration cannot be passed around the circumference of the central rotor disk. Therefore, flutter is reduced. However, because the divide only extends part way through the thickness of the rotor disk, the bladed disk remains a single unitary piece.

Also, because the modification to reduce flutter is formed in the central rotor disk, rather than the blades, the blades can be of identical design, and no work is required on the air flow going into the bladed disk, and so fan performance can be optimised.

The method may include forming one or more further set of divides, each divide comprising a partial break in the rotor disk extending axially from the first end of the rotor disk to the second end of the rotor disk and radially from the first radius to a third radius, less than the first radius and greater than the second radius, wherein the divides are arranged such that a partial break is provided in the rotor disk between each of the blades, wherein the divides of each set of divides are different, and wherein sets of divides are arranged in sequence circumferentially around the axis of rotation, such that the divides on either side of each blade are different.

Provision of three or more sets of divides further increases the asymmetry around the central rotor disk, providing greater control over how the flutter is reduced.

Forming each divide may comprise: boring, at the third radius, a through-hole extending from the first end of the rotor disk to the second end of the rotor disk; and cutting a slot extending from the first radius to the through-hole, along the axial length from the first end of the rotor disk to the second end of the rotor disk.

By forming the divide in two separate steps, the divide is simple and quick to make, making the bladed disk simple and quick to manufacture.

The method may include boring the through-holes of each divide in a set with the same shape and/or size; and boring the through-holes of different sets with different shape and/or size.

The arrangement of a through-hole of variable shape and/or size and a slot provides a bladed disk that is simple to form, whilst also making it easy to tune the stiffness characteristics of the blade support material.

The method may include filling at least part of each divide with a filler material. The filler material may be provided in a region extending from the first radius. The filler material provides continuity in the structure of the disk, whilst maintaining the partial division of the disk to prevent vibrations extending around the disk. The continuity of structure provides improved strength in the disk.

The filler material may comprise a resiliently deformable material. This provides a secondary damping mechanism, for reducing vibrations and flutter. The resiliently deformable material may be a visco-elastic material.

The bladed disk may be formed of a meta matrix composite material. The meta matric composite may provide improved strength.

The method may include incorporating the bladed disk into a turbine engine or boundary layer propulsion system.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
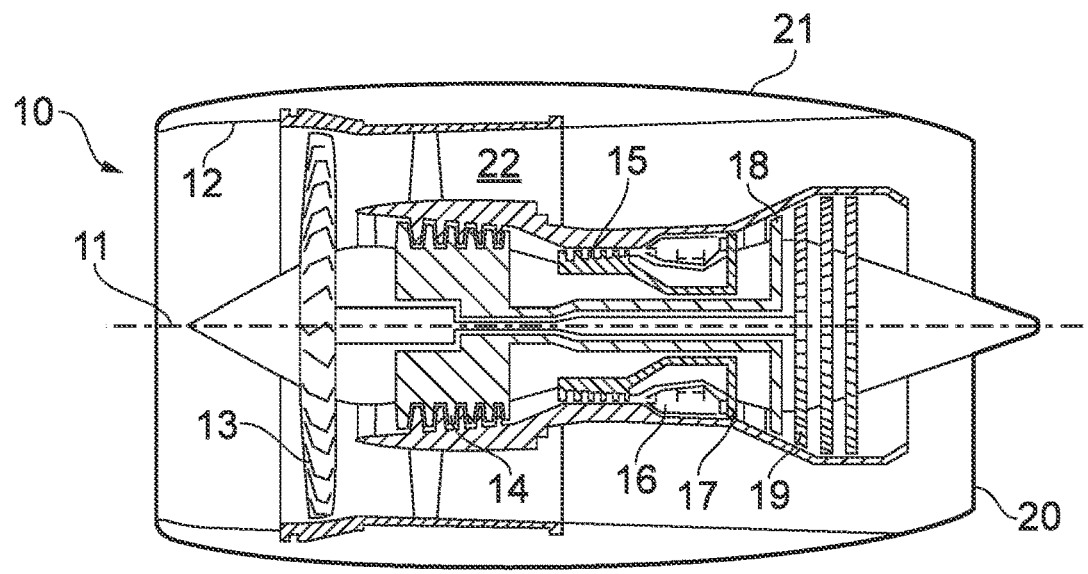
FIG. 1 is a sectional side view of a gas turbine engine.
Figure 2A:
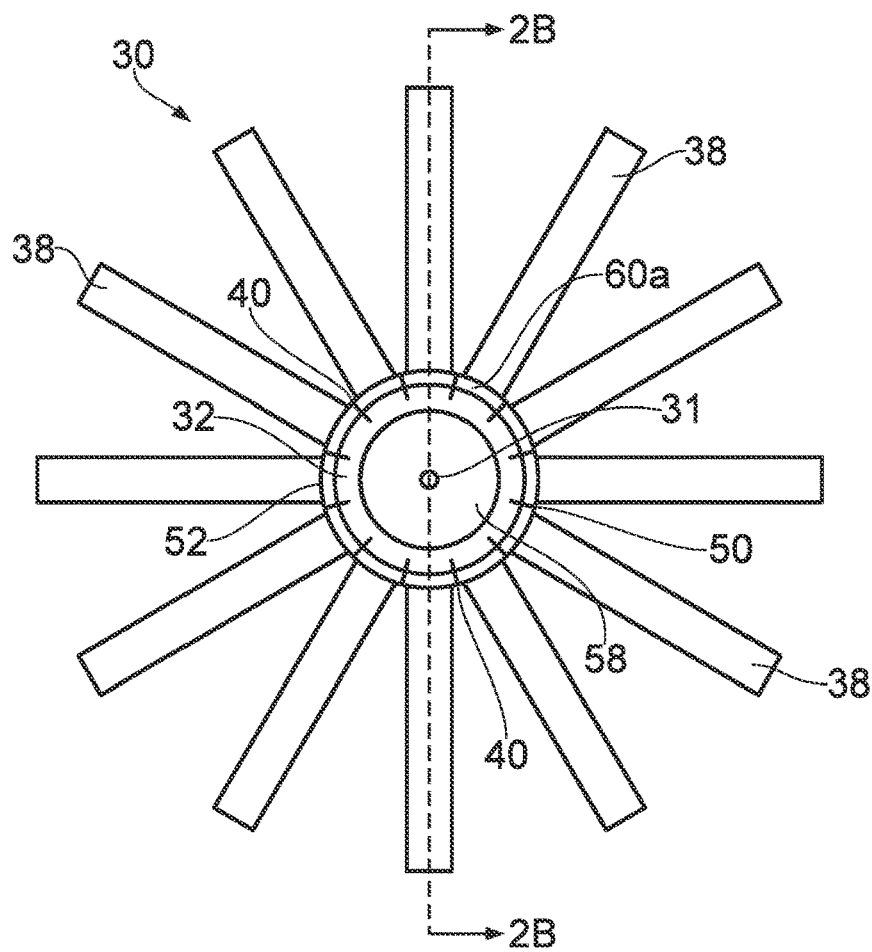
FIG. 2A is s schematic front view of a bladed disk according to an embodiment of the disclosure.
Figure 2B:
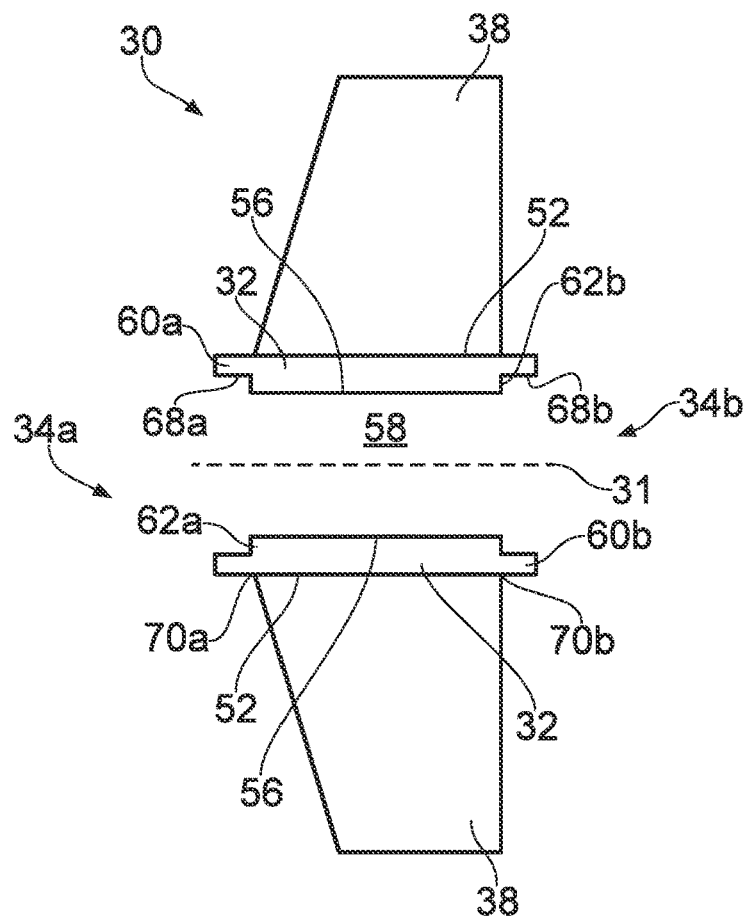
FIG. 2B is a sectional side view of the bladed disk of FIG. 2A.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Furthermore, the present disclosure may be applied to propulsion systems other than gas turbine engines. One example of an alternative propulsion system is a boundary layer ingestion propulsion system.

In travel, the body of an aircraft or other vessel creates a body wake, which is the disturbance in downstream flow resulting from the air flowing over the body. A proportion of the body wake results from the boundary layer flow over the surface of the aircraft detaching from the surface as the flow leaves the aircraft, referred to as mixing losses.

Reducing the size of, or eliminating the body wake altogether reduces the losses generated in the wake and also in the main jet by reducing the thrust requirements from the main engines.

The concept of boundary layer ingestion places an engine at or immediately behind the tail of the aircraft or vessel so as to ingest the boundary layer flow as it leaves the surface or body. In this way, the downstream mixing losses in the body wake can be eliminated or significantly reduced.

The boundary layer propulsion system has one or more boundary layer ingestion fans arranged around a principle axis of rotation. The boundary layer propulsion system may also include fans in compressor and/or turbine systems.

The propulsive fan 13, the ingestion fan(s), the compressor sections 14, 15 and turbine sections 17, 18, 19 all include rotary fan components. Any of these rotary fan components may comprise a bladed disk.

FIGS. 2A and 2B, 3A and 3B, and 4 illustrate an example of a bladed disk 30 according to a first embodiment of the disclosure.

The bladed disk 30 comprises a central rotor disk 32, in the form of a cylinder extending around and along the rotational axis 31 of the bladed disk 30. The cylindrical central rotor disk 32 has a passage 58 extending along the rotational axis 31, which is used to mount the disk 32 to a shaft.

Depending on the position of the bladed disk 30 in the turbine engine 10, the rotational axis 31 of the bladed disk 30 may coincide with the principal rotational axis 11 of the engine, or may be different.

Figure 3A:
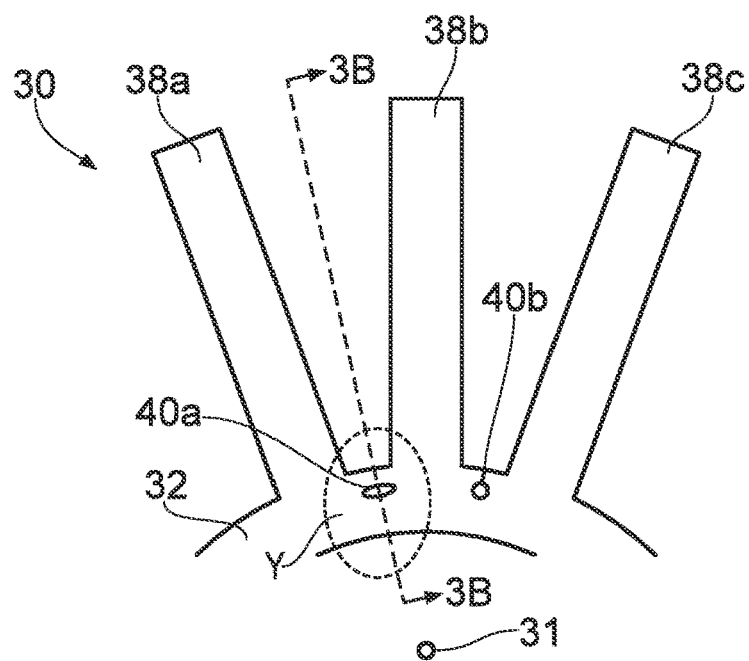
FIG. 3A is schematic sectional front view of a portion of the bladed disk of FIG. 2A.
Figure 3B:
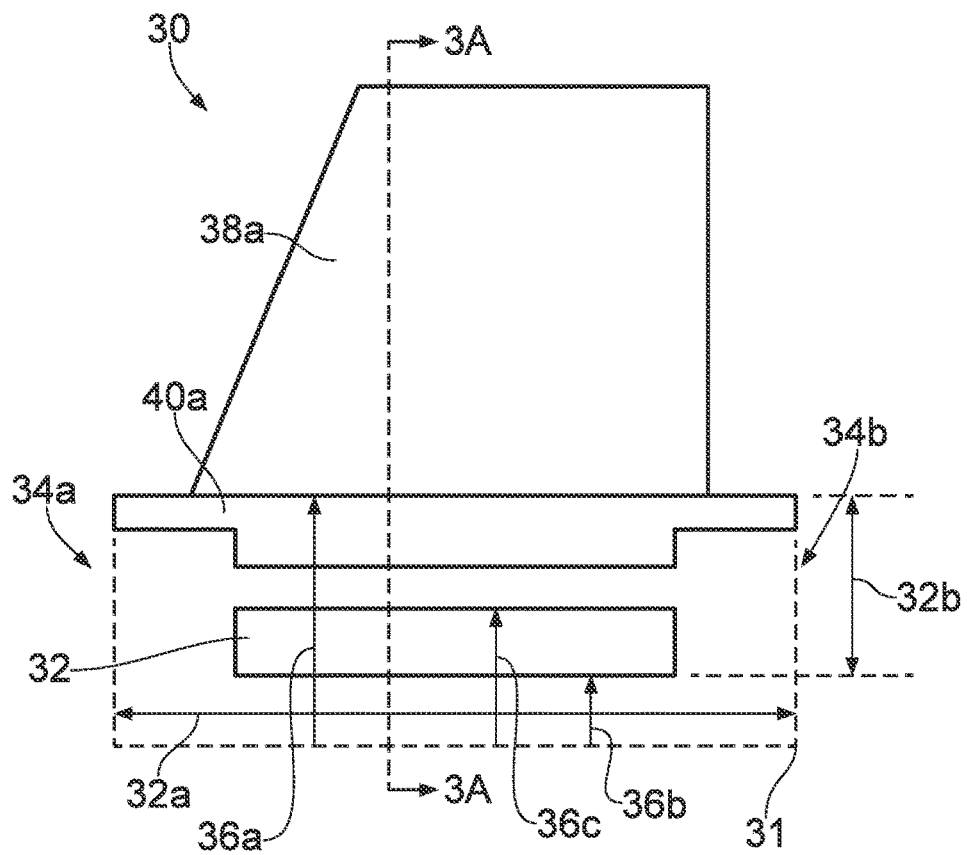
FIG. 3B is a sectional side view of the portion of the bladed disk shown in FIG. 3A.

As shown in FIG. 3B, the cylindrical central rotor disk 32 extends parallel to the rotational axis 31. Along the axis of rotation 31, the central rotor disk 32 extends from a first end 34a to a second end 34b, and has a length 32a in this direction.

As shown in FIGS. 3A and 3B, in cross section perpendicular to the rotational axis 31, the central rotor disk 32 is annular in shape, having a thickness 32b between an outer surface 50 and an inner surface 56. The distance from the axis of rotation 31 to the outer surface 50 is a first radius 36a, and the distance from the axis of rotation 31 to the inner surface 56 is a second radius 36b, smaller than the first radius 36a.

The blades 38 of the bladed disk 30 are arranged circumferentially around the central rotor disk 32, such that, in cross section perpendicular to the axis of rotation 31, each blade 38 occupies a circumferential portion of the outer surface 50 of the central rotor disk 32.

The blades 38 may be of identical or different design. Each blade is formed of a blade hub 52 where the blade 38 meets the disk 32, and a body 64 extending away from the central rotor disk 32, radially from the axis of rotation 31.

The hub 52 of each blade 38 extends along the outer surface 50 of the central rotor disk 32, in a direction from the first end 34a to the second end 34b. In this direction, the blade hub 52 may be straight or curved along the outer surface 50. Therefore, in a cross-sectional view perpendicular to the axis of rotation 31, the circumferential position of respective blade 38a varies at different points along the axis of rotation 31.

A first end 70a of the hub 52 is spaced from the first end 34a of the central rotor disk 32, and a second end 70b of the hub 52, opposite the first end 70a, is spaced from the second end 34b of the central rotor disk 32.

At the first end 34a of the central rotor disk 32, a circumferential lip 60a is formed. The lip 60a comprises a thinned portion of the disk 32 extending along the axis of rotation 31. The lip 60a is formed between the first radius 36a, and an inner face of 68a formed at a radius larger than the second radius 36b and smaller than the first radius 36a.

Therefore, the outer surface 50 of the disk 32 is uninterrupted along its length 32a, and the central passage 58 includes a step 62a at the first end 34a, and is thus widened at the first end 34a. In the example shown in FIGS. 2B and 3B, the step 62a is perpendicular to the axis of rotation 31, however, in other examples, it may be sloped or curved. The steps 62a,b in the internal surface 56 of the central rotor disk 32 are formed at or near the ends 70a,b of the blade hubs 52.

A second circumferential lip 60b is formed at the second end 34b of the disc 32. The second lip 60b is similar to the first lip 60a, with a second step 62b formed in the inner surface 56 of the central rotor disk 32.

A number of through-holes 44 are formed in the central rotor disk 32. The through-holes 44 extend in a direction from the first end 34a of the central rotor disk 32 to the second end 34b. When viewed in cross-section, perpendicular to the axis of rotation 31, the through-holes 44 are arranged circumferentially around the axis of rotation 31, with each through-hole 44 provided between a pair of blades 38. Therefore, the through-holes 44 are provided between hypothetical radial lines drawn between each blade hub 52 and the axis of rotation 31.

The through-holes 44 extend between the blade hubs 52 along the length of the central rotor disk 32, and so the through-holes 44 may also follow a straight path or curved path in the direction from the first end 34a to the second end 34b, such that they run parallel to the blade hubs 52.

Radially, in cross-section perpendicular to the axis of rotation 31, the through-holes 44 are provided at a position below the outer surface 50 of the central rotor disk 32 (first radius 36a) and above the inner surface 56 (second radius 36b).

Figure 4:
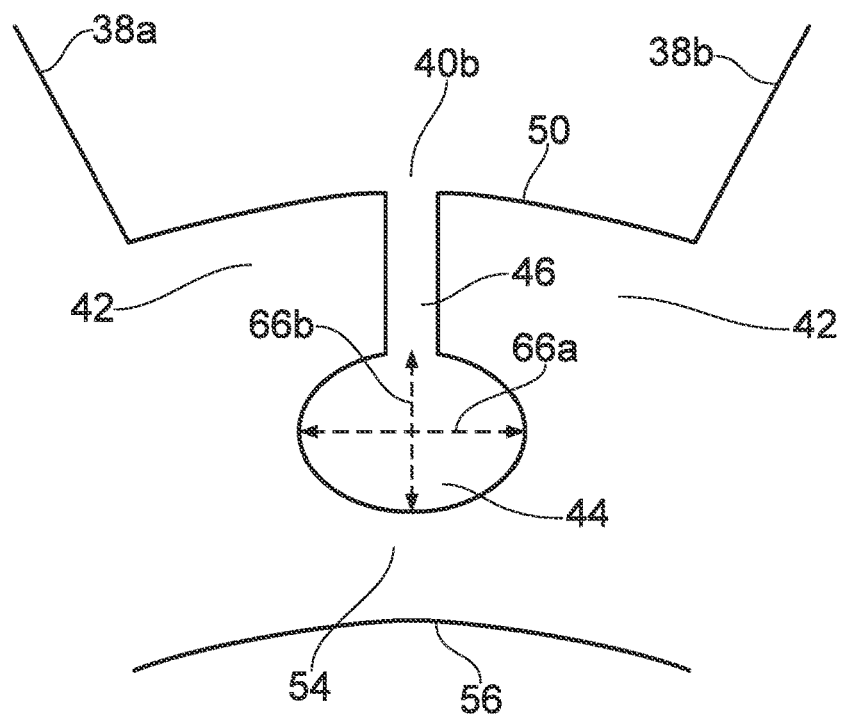
FIG. 4 is a schematic sectional front view of the region labelled Y in FIG. 3A.

When measured from the radially inner most part of the through-hole, 44, the through-holes 44 are provided at a third radius 36c form the axis of rotation 31. The third radius 36c is different to the first radius 36a and the second radius 36b, and between the first radius 36a and the second radius 36b. FIG. 4 shows one of the through-holes 44 in more detail.

The through-holes 44 shown in FIGS. 3A and 4 are oval in shape, having a major (long) axis 66a defined by the maximum distance between opposing sides, and a perpendicular minor (short) axis 66b. The through-holes 44 have the same size measured along the minor axis 66b. However, a first set of the through-holes 44a all have a first size measured along the major axis 66a, whilst a second set of through-holes 44b, all have a second, different, size measured along the major axis 66a.

The first set of through-holes 44a and the second set of through-holes 44b are alternated around the circumference of the central rotor disk 32, such that for each blade 38, the through-hole 44a on one side is of different size to the through-hole 44 on the other.

Slots 46 are also provided in the central rotor disk 32. Again, FIG. 4 shows one of the slots 46 in more detail.

The slots 46 are formed in the outer surface 50 of the central rotor disk 32, and extend into the through-holes 44. As with the through-holes 44, the slots 46 extend in the direction from the first end 34a of the central rotor disk 32 to the second end 34b, and are provided between the blade hubs 52, and so may follow a straight path or a curved path along the outer surface 50 of the central rotor disk 32.

The slots 46 extend from first end 34a of the central rotor disk 32 to the second end 34b, and so are also formed in the lips 60a,b. In the example shown, the slots 46 are the same around the circumference of the central rotor disk 32.

The through-holes 44 and slots 46 combine to form divides 40a,b in the central rotor disk 32. The divides 40a,b comprise a first set 40a of divides, including those divides incorporating the first set of through-holes 44a and second set of divides 40b, including those divides 40b incorporating the second set of through-holes 44b.

As discussed above, the through-holes 44 are provided above the inner surface 56 of the central rotor disk 32. Therefore, the divides 40a,b, do not fully split the central rotor disk 32. Radially, the central rotor disk 32 is formed of two portions, a first portion between the inner surface 56 and the third radius 36c, at the base of the divides 40a,b, forms a core portion 54 of the central rotor disk 32. A second portion, between the third radius 36c and the outer surface 50, forms a foundation portion 42. The foundation portion 42 supports the blades 38, and the core portion 54 provides structural continuity around the central rotor disk 32, so that the bladed disk 30 is still formed of a single continuous part.

The core portion 54 is continuous around the circumference of the central rotor disk 32 (and along the length of the disk 32). However, the foundation portion 42 associated with each blade 38 is isolated from the foundation portions 42 associated with the other blades 38. Therefore, the central rotor disk 32 is discontinuous around the circumference of the foundation portion 42, with discontinuities between each blade 38.

The variation of the first set of divides 40a to the second set of divides 40b introduces asymmetric stiffness into the foundation portion 42 associated with each blade 38. Therefore, the resonant frequency at which flutter occurs in a blade 38 will alternate for adjacent blades 38, and so adjacent blades 38 will not excite flutter in each other.

Furthermore, since the divides 40 isolate the foundation portions 42 of each blade 38 from the foundation portion 42 of the other blades 38, vibration cannot be passed around the circumference of the central rotor disk 32.

Therefore, flutter in the bladed disk 30 is reduced. The reduction is achieved by modifying the material of the central rotor disk 32, to isolate adjacent blades 38 from each other, whilst the internal structures and stiffness of the blades 38 are the same.

Figure 5:
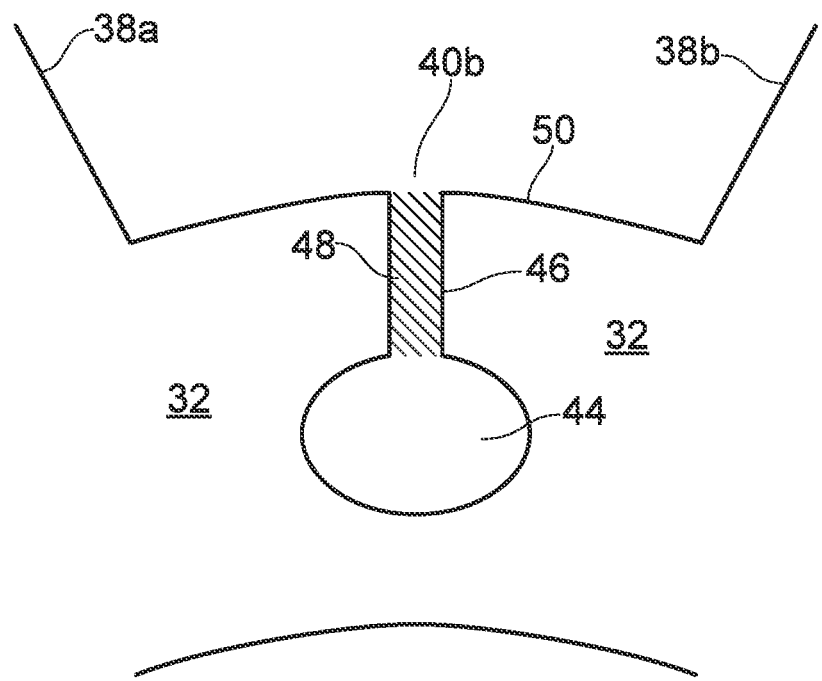
FIG. 5 is a schematic sectional front view of the region labelled Y, showing an alternative embodiment of the disclosure in more detail.

FIG. 5 illustrates a schematic example of a divide 40 formed according to a second embodiment of the disclosure. The second embodiment is identical to the third embodiment, except that a filler material 48 is provided in the slots 46 of the divides 40a,b.

The filler material 48 provides mechanical isolation of the foundation portions 42 of the central rotor disk 32, but also provides continuity around the circumference of the central rotor disk 32, thus providing further strength.

Any suitable filler material 48 may be used. The requirements of the filler material 48 will depend on where the bladed disk 30 is to be used. For example, where the bladed disk 30 is used in a high temperature environment, the filler material 48 will need to withstand such temperatures.

In some embodiments, the filler material 48 may be resiliently deformable, in order to provide damping of vibrations, further reducing flutter. The resiliently deformable material 48 may be visco-elastic in some embodiments, exhibiting both viscous and elastic properties.

In the embodiments discussed above, the bladed disk 30 includes a first set of divides 40a and a second set of divides 40b, arranged in alternating sequence around the circumference of the central rotor disk 32, between the blades 38. It will be appreciated that this is by way of example only. In alternative embodiments, there may be three or more sets of divides 40.

In embodiments including three or more sets of divides 40, the divides 40a,b are all constructed as discussed above. Across all sets of the divides 40, the slot 46 is the same and, within each set, the through-hole 44 is the same. However, different sets of divides 40a,b will have different size of through-holes 44 along the major axis 66a.

The divides 40 can be arranged in any sequence where no two adjacent divides 40a,b are the same, such that the asymmetric stiffness is provided. For example, in the embodiment with three sets of divides 40, the divides 40 may be arranged in repeating order of first set; second set; third set. Alternatively, the divides 40 may be arranged in repeating patterns of first set; second set; third set; second set.

In the embodiments discussed above, the variation in the divides 40 is achieved by varying the size of the through-holes 44 along the major axis 66a. It will be appreciated that this is just one example of how to provide asymmetrical stiffness. For example, the desired stiffness can be achieved by varying one or more of the following parameters, alone or in combination: size of the through-hole 44 (in any direction perpendicular to the rotary axis of the bladed disk 30); shape of the through-hole 44 (for example oval or circular, or asymmetric oval); radial position of the through-hole 44, and thus depth of the slot 46 (i.e. the third radius 36c); the width of the slot 46; and the shape of the slot 46 (e.g. straight sided or tapering, with non-parallel walls). One or more of these parameters can be varied to achieve desired frequency responses for each of the blades 38.

In some embodiments, the parameters of the divides 40 are constant along the length of the divide 40 from the first end 34a to the second end 34b. However, in other embodiments, the parameters may vary along this length. This variation can also be used to tune the desired frequency response of the blades 38.

In the embodiments discussed above, each divide 40a,b includes a first radial portion (in the examples given above, the through-holes 44) provided at the third radius 36c which provides asymmetric variation in the stiffness of the foundation portion 42 of the central rotor disk 32, and a second radial portion (in the examples given above, the slots 46) which, in combination with the first radial portion, provides isolation between adjacent blades 38. It will be appreciated that this is by way of example only.

For example, in some embodiments, the second radial portion may be provided between the first radius 36a and the third radius 36c, and the first radial portion may be provided at some position between the first radius 36a and third radius 36c (such that, in the above examples, the slot 46 extends through the through-hole 44, rather than ending at it). In addition, either or both of the radial portions may be varied circumferentially around the disk 32 to provide asymmetry. Furthermore, in other examples, the first and second radial portions may be separate.

In some embodiments, the divides 40 may not comprise two radial portions. Instead, the divides 40 may be formed of a single portion, for example the divides 40 may only comprise the slot 46. The divides 40 are still varied circumferentially around the disk 32, to provide the desired asymmetry. In yet further example, the divides 40 may include three or more radial portions. One or more of these portions can be varied to provide the asymmetry.

In the embodiment discussed in relation to FIG. 5, the filler material 48 fills the slot 44. It will be appreciated that in some examples, the filler material 48 may fill all or part of the slot 46. Furthermore, in some embodiments, the filler material 48 may fill some or part of the through-hole 44 in addition to the slot 46.

The bladed disk 30 may be formed of any suitable material. For example, the bladed disk 30 may be a metal or alloy, a metal matrix composite, a ceramic, a ceramic matrix composite, or any other material. Where the bladed disk 30 is used in a high temperature environment, the material will need to withstand such temperatures.

In some embodiments, the core portion 54 may be strengthened by provision of extra material. This may be achieved by manufacturing the bladed disk 30 with a larger thickness 32b, or adding material after manufacture.

As discussed above, the divides extend to a third radius 36c. The difference between the first radius 36a and the third radius 36c defines the radial depth of the divides 40, and the difference between the third radius 36c and the second radius 36b defines the radial depth of the core portion 54 of the central rotor disk 32. The depth of the divides 40 is such that the desired isolation and frequency characteristics are obtained. The depth of the core portion 54 should be sufficient to maintain structural integrity of the bladed disk 30.

The divides 40 may extend to any radius between the outer surface 50 (first radius) and the minimum sufficient radius required for the core portion 54 to provide structural integrity. In divides 40 including a through-hole 44, the through-hole 44 may be provided at any position between these radii. In some embodiments, the through-hole 44 may be provided at the outer surface 50, so that the through-hole is open to the outer surface 50.

It will be appreciated that relative sizes discussed above will vary depending on a number of factors, including the desired strength characteristics, the materials used, and the desired frequency responses.

It will be appreciated that the particular arrangement of the central rotor disk 32 and blades 38 given above is by way of example only. The above principles may be applied to any appropriate design of bladed disk 30. For example, there may be any number of blades 38, any arrangement of blades 38, the central rotor disk 32 may be of any suitable design, and the lips 60a,b may be omitted, or the lips 60a,b may be curved from the end 34 of the outer surface 50, such that a separate step 62a,b is not formed.

Figures 6A, 6B, 6C:
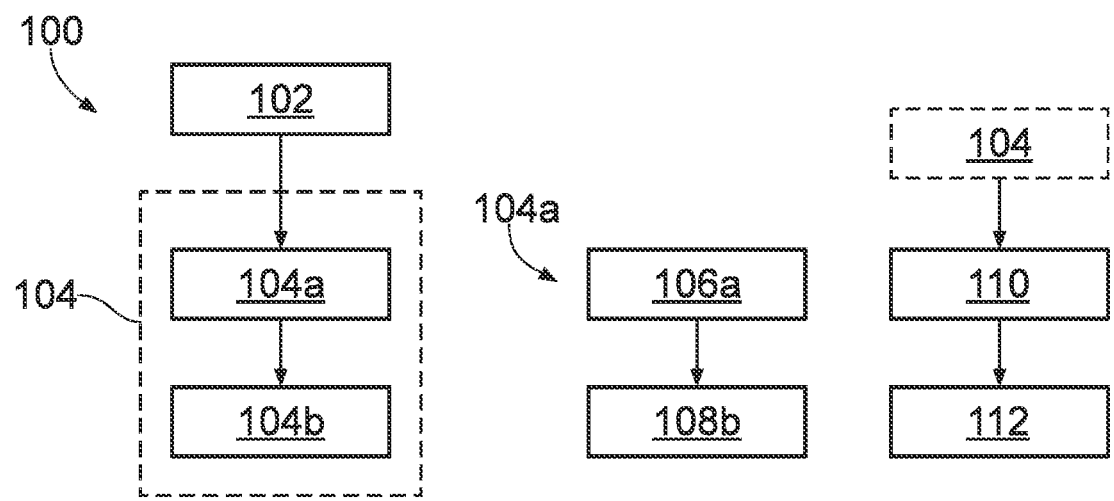
FIG. 6A illustrates a method for manufacturing a bladed disk.
FIG. 6B illustrates the second step of the method of FIG. 6A in more detail.
FIG. 6C illustrates additional optional steps for the method of FIG. 6A.

FIG. 6A illustrates an example method 100 for manufacturing a bladed disk 30 as discussed above, according to an embodiment of the disclosure.

In a first step 102, a bladed disk 30 is formed, with the integral blades 38 and central rotor disk 32. The bladed disk 30 is formed without divides 40, so that the foundation portion 42 is continuous. The bladed disk 30 may be formed may be by any method such as casting, or machining a pre-cast workpiece.

In a second step 104, the divides 40a,b are formed. The second step 104 may include a step 104a of forming the first set of divides 40a and a step 104b of forming the second step of divides 40b.

It will be appreciated that the step of forming the first set of divides 104a and the step of forming the second set of divides 40b may be carried out concurrently, sequentially, or interleaved. For example, all the first set of divides 40a may be provided and then all of the second set of divides 40b may be provided. Alternatively, the divides 40a,b may be provided in order around the circumference.

FIG. 6B shows the method for forming 104 each divide 40a,b. At a first step 106, the through-hole 44 is bored in the central rotor disk 32. This may be by any suitable method such as drilling and the like. As a second step 108, the slot 46 is cut. Again, this may be by any suitable method, such as wire cutting and the like.

Again, it will be appreciated that the sub-steps 106, 108 of step 104 may be carried out in any particular order. For example, all the through-holes 44 for both sets of divides 40a,b may be bored before the slots 46 are cut.

FIG. 6C illustrates further optional steps that may be included in the method 100 of FIG. 6A.

In a first optional step 110, the filler material 48 is provided into the slots 46. Again, it will be appreciated that this step may be performed at any time after the slot 46 is formed. In a second optional step 112, the completed bladed disk 30 may be provided in a turbine engine or other turbomachine. It will be appreciated that both steps shown in FIG. 6C are optional and may be carried out independently of each other, and/or together.

In embodiments where the bladed disk 30 includes three or more different sets of divides 40, the additional sets of divides 40 are formed as discussed above.

Except where mutually exclusive, any of the features may be employed separately or in combination with any other features and the disclosure extends to and includes all combinations and sub-combinations of one or more features described herein.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

What is claimed is:

1. A bladed disk arranged to rotate about an axis of rotation and including:
   a rotor disk having an axial length extending from a first end to a second end, along the axis of rotation and a radial thickness extending between a first radius from the axis of rotation and a second radius from the axis of rotation, less than the first radius;
   a plurality of blades formed integrally with the rotor disk and arranged circumferentially around the rotor disk; and
   a first set of divides and a second set of divides, each divide comprising a partial break in the rotor disk extending axially from the first end of the rotor disk to the second end of the rotor disk and radially from the first radius to a third radius, less than the first radius and greater than the second radius, the divides arranged such that a partial break is provided in the rotor disk between each of the blades,
   wherein the divides of the first set are different to the divides of the second set, and wherein the first set of divides and second set of divides are arranged in sequence circumferentially around the axis of rotation, such that the divides on either side of each blade are different.

2. The bladed disk of claim 1, comprising one or more further set of divides, each divide comprising a partial break in the rotor disk extending axially from the first end of the rotor disk to the second end of the rotor disk and radially from the first radius to a third radius, less than the first radius and greater than the second radius,
   wherein the divides are arranged such that a partial break is provided in the rotor disk between each of the blades, wherein the divides of each set of divides are different, and wherein the sets of divides are arranged in sequence circumferentially around the axis of rotation, such that the divides on either side of each blade are different.

3. The bladed disk of claim 1, wherein the rotor disk comprises a foundation portion at the first radius that supports the plurality of blades; wherein each divide comprises a first radial portion and a second radial portion; wherein the first radial portion determines the stiffness of the adjacent foundation portions, and wherein the second radial portion isolates the foundation portion associated with circumferentially adjacent blades.

4. The bladed disk of claim 3, wherein the first radial portion of each of the first set of divides has different size and/or shape to the first radial portion of each of the second set of divides, such that stiffness of the foundation portion varies circumferentially around the rotor disk.

5. The bladed disk of claim 3, wherein the first radial portion of each divide is provided at the third radius, and the second radial portion of each divide extends from the first radius to the first radial portion.

6. The bladed disk of claim 3, wherein the first radial portion of each divide comprises a through-hole extending from the first end of the rotor disk to the second end of the rotor disk, and the second radial portion of each divide comprises a slot extending from the first radius to the through-hole.

7. The bladed disk of claim 6, wherein, in a cross section perpendicular to the axis of rotation, each through-hole has a shape and size, wherein the through-holes in the same set have the same shape and/or size, and wherein through-holes of different sets have different shape and/or size.

8. The bladed disk of claim 1, including a filler material provided in at least part of each divide.

9. The bladed disk of claim 8, wherein the filler material comprises a resiliently deformable material.

10. The bladed disk of claim 1, wherein the first radius defines an outer surface of the rotor disk, wherein each blade comprises a hub where the blade joins the rotor disk, wherein the hub of each blade follows a curved path along the outer surface of the rotor disk, and wherein each divide extends parallel to the blade hubs.

11. The bladed disk of claim 1, wherein the blisk is formed of a meta matrix composite material.

12. A turbine engine or boundary layer ingestion propulsion system comprising one or more bladed disk according to claim 1.

13. A method of manufacturing a bladed disk, the method including:
   constructing, as a single integral component, a rotor disk and a plurality of blades arranged circumferentially around the rotor disk, the rotor disk having an axial length extending from a first end to a second end, along an axis of rotation of the bladed disk and a radial thickness extending between a first radius from the axis of rotation and a second radius from the axis of rotation, less than the first radius;
   forming a first set of divides and a second set of divides, each divide comprising a partial break in the rotor disk extending axially from the first end of the rotor disk to the second end of the rotor disk and radially from the first radius to a third radius, less than the first radius and greater than the second radius, the divides arranged such that a partial break is provided in the rotor disk between each of the blades,
   wherein the divides of the first set are different to the divides of the second set, and wherein the first set of divides and second set of divides are arranged in sequence circumferentially around the axis of rotation, such that the divides on either side of each blade are different.

14. The method of claim 13, including forming one or more further set of divides, each divide comprising a partial break in the rotor disk extending axially from the first end of the rotor disk to the second end of the rotor disk and radially from the first radius to a third radius, less than the first radius and greater than the second radius,
   wherein the divides are arranged such that a partial break is provided in the rotor disk between each of the blades, wherein the divides of each set of divides are different, and wherein sets of divides are arranged in sequence circumferentially around the axis of rotation, such that the divides on either side of each blade are different.

15. The method of claim 13, wherein forming each divide comprises:

boring, at the third radius, a through-hole extending from the first end of the rotor disk to the second end of the rotor disk; and cutting a slot extending from the first radius to the through-hole, along the axial length from the first end of the rotor disk to the second end of the rotor disk.

16. The method of claim 15, including:

boring the through-holes of each divide in a set with the same shape and/or size; and boring the through-holes of different sets with different shape and/or size.

17. The method of claim 13, including filling at least part of each divide with a filler material.

18. The method of claim 17, wherein the filler material comprises a resiliently deformable material.

19. The method of claim 13, wherein the bladed disk is formed of a meta matrix composite material.

20. A method of claim 13, including incorporating the bladed disk into a turbine engine or boundary layer propulsion system.

* * * * *